United States Patent [19]
Murray

[11] Patent Number: 5,266,854
[45] Date of Patent: Nov. 30, 1993

[54] ELECTROMAGNETIC TRANSDUCER

[75] Inventor: Bruce S. Murray, Winchester, Mass.

[73] Assignee: Bolt Beranek and Newman Inc., Cambridge, Mass.

[21] Appl. No.: 575,326

[22] Filed: Aug. 30, 1990

[51] Int. Cl.[5] .......................................... H02K 33/00
[52] U.S. Cl. ........................................ 310/36; 310/38; 318/124
[58] Field of Search ................. 310/36.29, 37, 38, 39; 318/119, 124, 556, 114; 322/3

[56] References Cited

U.S. PATENT DOCUMENTS

| Re. 30,068 | 8/1979 | Meyers ................................ 318/124 |
| 2,419,196 | 4/1947 | Benioff . |
| 3,018,467 | 1/1962 | Harris . |
| 3,205,476 | 9/1965 | Massa . |
| 3,219,969 | 11/1965 | Snavely . |
| 3,225,326 | 12/1965 | Massa . |
| 3,308,423 | 3/1967 | Massa, Jr. . |
| 3,327,285 | 6/1967 | O'Connor . |
| 3,363,227 | 1/1968 | Massa, Jr. . |
| 3,441,903 | 4/1969 | Massa, Jr. . |
| 3,464,057 | 8/1969 | Hayner . |
| 3,493,793 | 2/1970 | Niemela ................................ 310/29 |
| 3,538,358 | 11/1970 | Bauerle ................................ 310/36 |
| 3,691,515 | 9/1972 | Pida . |
| 3,725,856 | 4/1973 | Chervenak . |
| 4,135,119 | 1/1979 | Brosens ................................ 310/36 |
| 4,460,854 | 7/1984 | Bauer ................................ 310/29 |
| 4,660,186 | 4/1987 | Massa . |
| 4,745,586 | 5/1988 | Massa . |
| 4,810,915 | 3/1989 | Lissenburg ............................ 310/37 |
| 4,885,487 | 12/1989 | Ksovreli ................................ 310/36 |

Primary Examiner—R. Skudy
Attorney, Agent, or Firm—Henry D. Pahl, Jr.

[57] ABSTRACT

In the electromagnetic transducer disclosed herein, first and second magnetic core structures are oriented in opposition with a space therebetween. In the space between the core structures, an armature is provided for completing magnetic circuits for both of the core structures with respective gaps. Spring means normally centers the armature structure between the core structures so that the respective gaps are nominally equal. On each of the core structures there is provided a first winding and a second winding. The first windings are connected in series to a supply of direct current thereby to bias the magnetic circuits and the second windings are connected to a source of alternating current with the second windings being installed or phased so that one of them aids the corresponding first winding while the other opposes the corresponding first winding.

6 Claims, 3 Drawing Sheets

ELECTROMAGNETIC TRANSDUCER

BACKGROUND OF THE INVENTION

The present invention relates generally to electromagnetic transducers and, more particularly, to an electromagnetic transducer for applying an oscillatory force to a load.

A great variety of electromagnetic transducers are known in the art. Two general categories are moving coil designs and so-called moving iron designs. These latter designs are sometimes referred to as variable reluctance devices. In general, the variable reluctance designs are capable of producing high forces in a compact volume and at a higher efficiency than moving coil designs. Such transducers, however, have not typically been useful when high linearity is desired since the basic relationship between the excitation current and the resulting force is in accordance with a square law and is thus non-linear.

Among the several objects of the present invention may be noted the provision of a magnetic attraction or variable reluctance transducer which is essentially linear in response; the provision of such a transducer which exhibits high efficiency; the provision of such a transducer which can generate high forces in a compact volume; the provision of such a transducer which is highly efficient and which is operable over a relatively wide frequency range; the provision of such a transducer which is highly reliable and which is of relatively simple and inexpensive construction. Other objects and features will be in part apparent and in part pointed out hereinafter.

SUMMARY OF THE INVENTION

An electromagnetic transducer constructed in accordance with the present invention employs first and second magnetic core structures which are oppositely oriented with a space therebetween. In the space between the two core structures, an armature is provided for completing magnetic circuits for both of the core structures with respective gaps. Means are provided for centering the armature structure between the core structures so that the respective gaps are nominally equal. On each of the core structures there is provided a first winding and a second winding. The first windings are connected in series to a supply of direct current thereby to bias the magnetic circuits and the second windings are connected to a supply of alternating current. The second windings are installed or phased so that one of them aids the corresponding first winding while the other opposes the corresponding first winding.

BRIEF DESCRIPTION OF THE DRAWINGS

Corresponding reference characters indicate corresponding parts throughout the several views of the drawings.

DESCRIPTION OF THE PREFERRED EMBODIMENT

The particular devices disclosed by way of illustration herein are adapted for applying oscillatory forces to a load structure and are often characterized as "shakers". The devices illustrated generate the oscillatory forces by working against an inertial or reaction mass which comprises the larger portions of the magnetic circuits and the energizing windings. The load to be excited is connected to an armature which is oscillated with respect to the reaction mass.

Figure 1:
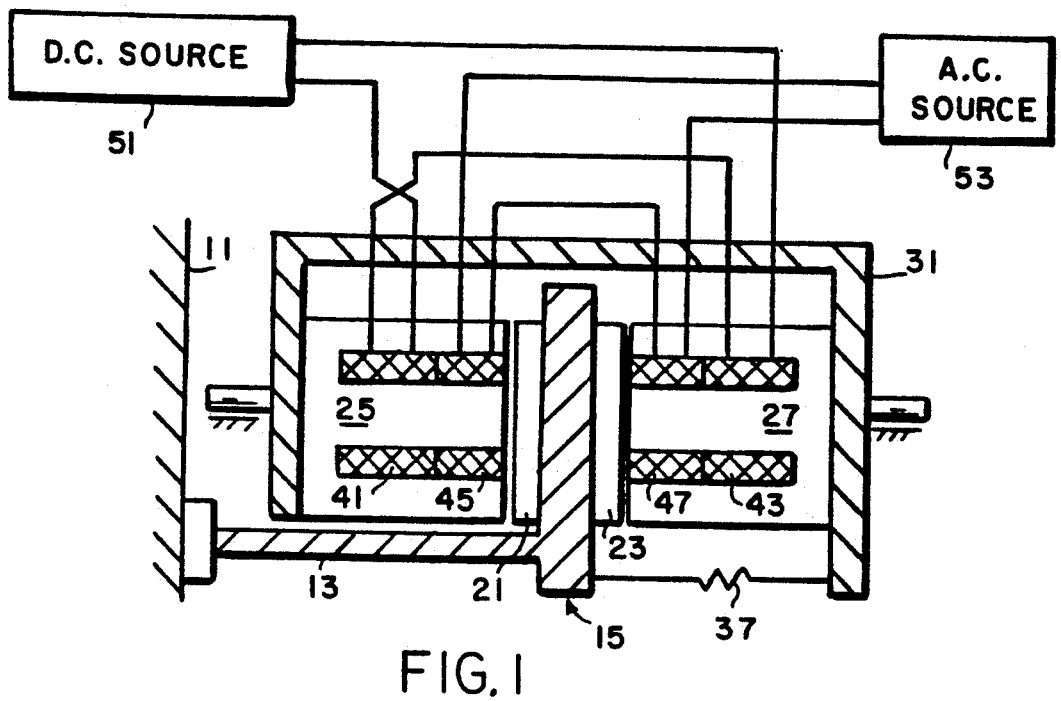
FIG. 1 is a schematic diagram of a transducer constructed in accordance with the present invention.

Referring now to FIG. 1, a load structure to be driven is indicated generally by reference character 11. The load structure is connected, through a beam or rod 13 to an armature structure 15.

The magnetic circuits employed in the particular transducers described herein are similar to those used in various electromagnetic devices and employ both E-shaped laminations which have energizing windings or coils wound around the middle leg of the E and I-shaped laminations which complete the magnetic circuits of the E-shaped laminations.

A pair of stacks of E-shaped laminations, i.e. open magnetic core structures, are designated by reference characters 25 and 27 respectively and are oppositely oriented with their leg portions facing inwardly and are held or maintained in spaced relationship with a space therebetween by a frame structure designated by reference character 31. An armature structure 15 is positioned between the two open core structures 25 and 27 and the armature structure incorporates two sets of I-shaped laminations or magnetic designated by reference characters 21 and 23. The I-shaped laminations complete the magnetic circuits of the respective stacks of E-shaped laminations with respective gaps. A spring, illustrated diagrammatically and designated by reference character 37, resiliently centers the armature structure between the core structures so that the respective gaps are nominally equal. Restoring to a nominal center position might also be accomplished electrically by a feedback circuit. As indicated previously, the E-shaped core structures, together with the frame structure, constitute an inertial mass. The mass of the armature structure is substantially smaller.

Each of the open core structures 25 and 27 carries a first or biasing winding designated by reference characters 41 and 43, respectively, and a second winding, designated by reference characters 45 and 47, respectively. The respective first windings are connected in series to a supply of direct current designated by reference character 51 so as to bias the two magnetic circuits. Each of the second windings is connected to an alternating current supply, designated by reference character 53. The second windings are, however, installed or phased relative to the respective first windings so that, at any given instant, one of the second or AC windings aids the corresponding DC winding while the other AC winding opposes the corresponding DC winding. This phasing also causes the induced AC voltages in the DC windings to essentially cancel so that no substantial AC load is impressed on the DC supply.

As is understood by those skilled in the art, the force exerted in a variable reluctance device is proportional to the absolute value of the square of the magnetomotive force or energizing current. Accordingly, the energization of such a device with alternating current only produces a highly non-linear force which is exerted at twice the frequency of the exciting current. In accordance with the present invention, the ampere turns or exciting force provided by the AC current is controlled to a level below that of the DC biasing current so that no frequency doubling occurs.

Figure 2:
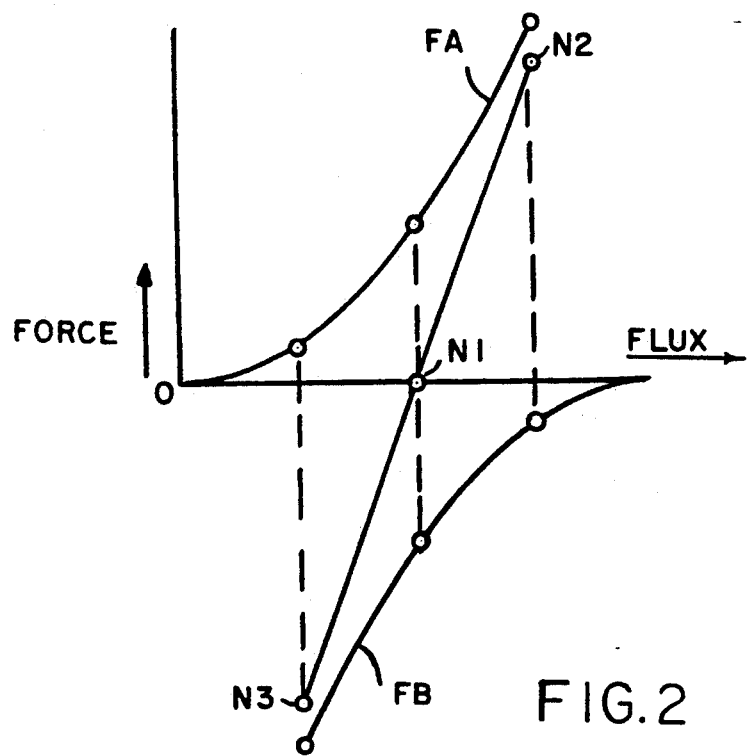
FIG. 2 is a diagram illustrating the generation of forces in the transducer of FIG. 1.

FIG. 2 illustrates the forces which are generated by each of the magnetic structures. The force generated by the left hand magnetic structure as a function of magnetic flux is illustrated by the curve designated FA and the force generated by the right hand magnetic structure as a function of magnetic flux is illustrated by the curve designated FB. As indicated, each of the forces is a non-linear function of the flux in the respective magnetic circuit. As illustrated, when there is no AC energization, the equal and opposite bias forces cancels so that there is no net force. This is indicated at point N1. On the other hand, when the AC current aids the bias in the left hand magnetic structure and decreases the attractive force of the right hand magnetic circuit, substantial net force is provided in one direction as indicated by point N2. Conversely when the AC energization reverses an opposite force is provided as indicated by the point N3. The three points and N1–N3 lie on a straight line and the net force between these points is essentially a straight line. Accordingly, although each magnetic circuit of itself has a distinctly non-linear characteristic, the two oppositely oriented magnetic circuits, when biased in balanced fashion, can exert a relatively linear transduction characteristic. This linearity of force with current can also be illustrated mathematically as follows $$F = k(I_{DC} \pm I_{AC})^2 - k(I_{DC} \pm I_{AC})^2 = 2kI_{DC}I_{AC}$$

where k is a proportionality constant

Figure 3:
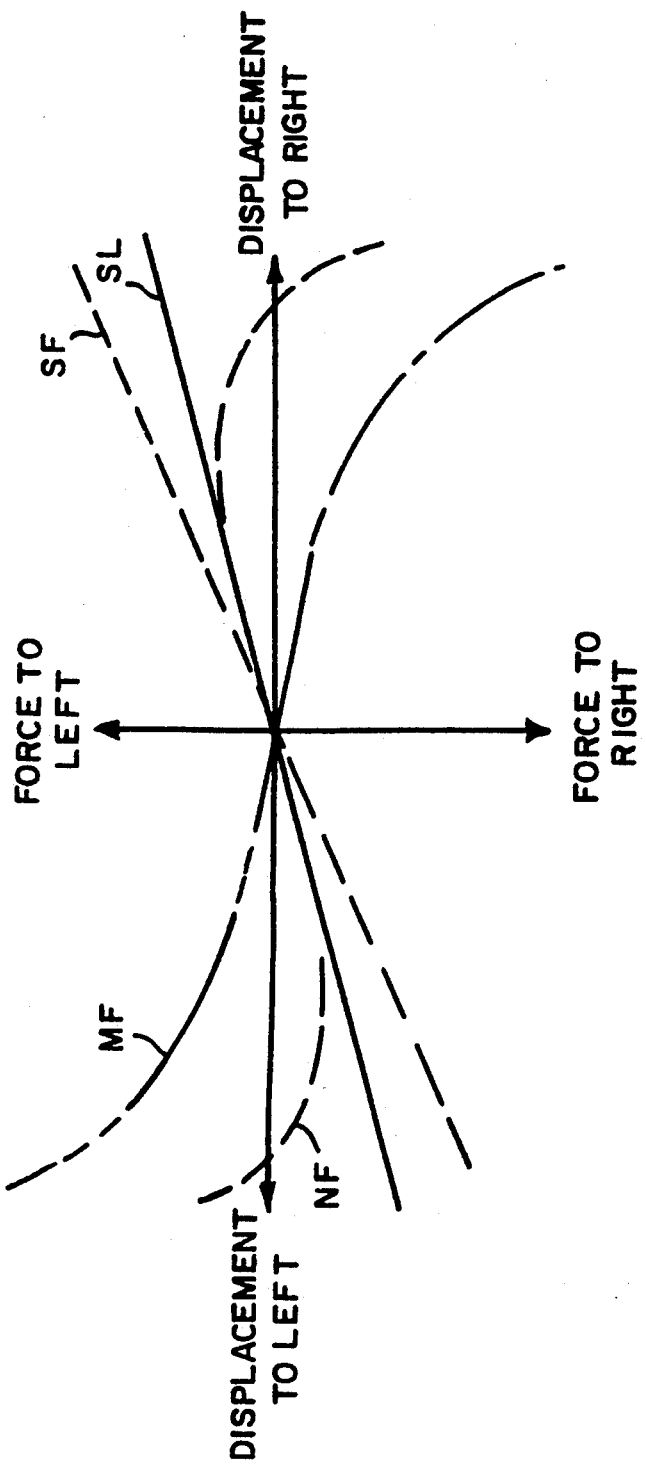
FIG. 3 is a diagram illustrating the relationship of magnetic and spring forces in the transducer of FIG. 1.

FIG. 3 is a diagram illustrating the effect of displacement of the armature structure on the magnetic force. The magnetic force characteristic alone is the curve designated by reference character MF. As will be understood by those skilled in the art, the slope of this curve through the origin will be a function of the bias current. The spring force is an essentially linear characteristic and is illustrated by the line designated by reference character SF. The net force which is the sum of the spring and magnetic forces is illustrated by the curve designated by reference character NF. The slope of the net force curve at mid position is indicated by the line SL. Thus, for small excursions around the mid point, the slope of this line fairly represents the restoring force which is exerted between the armature and the inertial mass which comprises the coil and core structures. Since the slope of the net force curve NF depends not only on the spring constant but also on the DC bias applied to the two core structures, it can be seen that the resonant frequency of the transducer can be adjusted over some range by merely adjusting the value of the DC current provided to the DC biasing windings 41 and 43. From this diagram, it can also be inferred that distortion is minimized if the oscillatory displacement of the armature structure is limited to only a portion of the gap. To facilitate this, it is preferable that the load be relatively stiff.

Figure 4:
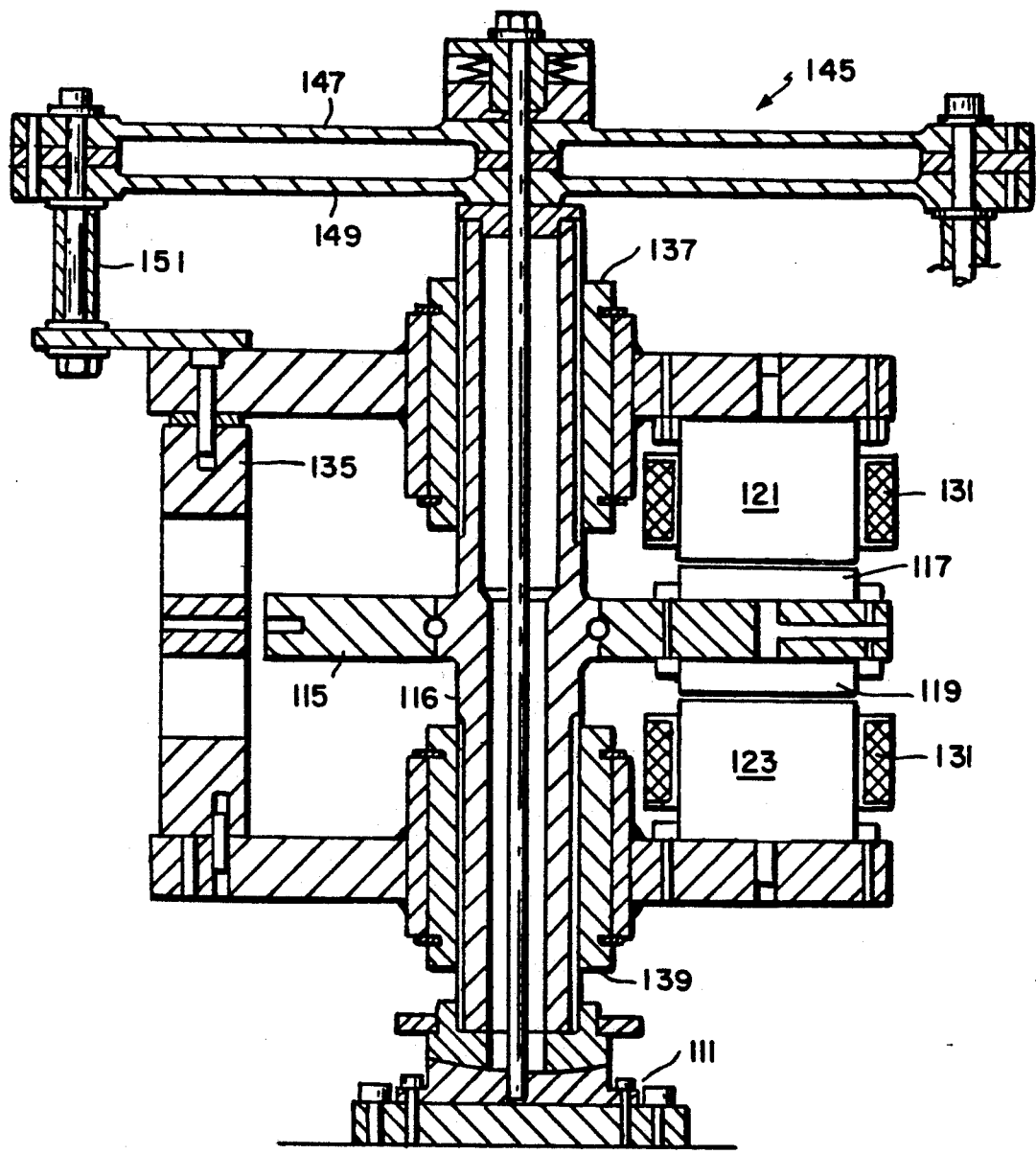
FIG. 4 is a cross-sectional drawing of a particular physical implementation of a transducer constructed in accordance with the present invention.

While FIG. 1 is diagrammatic in nature, FIG. 4 illustrates a useful and more detailed physical implementation of one embodiment of the construction of the present invention. The transducer illustrated in FIG. 4 is designed for operation in the frequency range of 20–200 Hz and incudes a mounting base or bracket 111 which is adapted to be connected to the load to be driven. The transducer comprises three similar magnetic driving systems distributed around the central axis at intervals of 120°. An armature frame 115 is connected to the mounting base 111 through a central stem 116. A pair of stacks of I-shaped laminations or magnetic cores are provided on opposite sides of the frame 115 for each of the three magnetic drivers. These stacks of I-laminations are indicated by reference characters 117 and 119.

The corresponding stacks of E laminations or open magnetic core are designated generally by reference characters 121 and 123 and the windings surrounding the center legs of the E-shaped laminations, both DC and AC, are designated by reference character 131. The stacks of E-shaped laminations are mounted on a frame structure designated generally by reference character 135 which is journaled on bearings 137 and 139 for relative axial motion with respect to the stem 116. Mounted on the end of the stem 116 opposite the bracket 111 is a spring structure 145 comprising a pair of radial arm elements 147 and 149. The peripheries of the arm elements 147 and 149 are connected to the frame structure 135 through tie rods 151. As indicated previously, the function of the spring structure is to maintain the armature structure normally located midway between the opposing open magnetic core structures 117 and 119.

As indicated previously, the resonant frequency of a transducer constructed in accordance with the present invention can be adjusted over some range by changing the DC bias current applied to the biasing windings on the magnetic core structures. The construction illustrated in FIG. 4 also facilitates the changing of resonant frequency over larger ranges by changing the stiffness of the spring structure. As can be seen, the spring structure is mounted substantially externally of the magnetic structures and thus different springs can be substituted without completely dismantling the magnetic portion of the transducer assembly.

In view of the foregoing it may be seen that the several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An electromagnetic transducer for driving a load, said transducer comprising:
   first and second open magnetic core structures oppositely oriented with a space therebetween;
   in the space between said open magnetic core structures, an armature structure for completing magnetic circuits for both of said open core structures with respective gaps;
   means for connecting said armature structure to the load to be driven;
   restoring means for centering said armature structure between said open core structures so that the respective gaps are nominally equal;
   on each of said open magnetic core structures, a first winding and a second winding;
   means for connecting said first windings in series to a supply of direct current thereby to bias the magnetic circuits; and
   means for connecting said second windings to a supply of alternating current with said second windings being phased such that one of said second windings aids a corresponding first winding when another second winding opposes the corresponding first winding thereby to oscillate said armature structure.

2. An electromagnetic transducer according to claim 1 wherein said restoring means is a spring.

3. An electromagnetic transducer according to claim 2 wherein said spring has a substantially linear characteristic.

4. An electromagnetic transducer for driving a load, said transducer comprising:

first and second open magnetic core structures;

means for holding said first and second open magnetic core structures oppositely oriented with a space therebetween, said open magnetic core structures and said holding means forming an inertial mass;

in the space between said open magnetic core structures, an armature structure for completing magnetic circuits for both of said core structures with respective gaps, the mass of said armature structure being substantially smaller than that of said inertial mass;

means for connecting said armature structure to the load to be driven;

spring means for resiliently centering said armature structure between said open core structures so that the respective gaps are nominally equal;

on each of said open core structures, a first winding and a second winding;

means for connecting said first windings in series to a supply of direct current thereby to bias the magnetic circuits; and means for connecting each of said second windings to a supply of alternating current with said second windings being phased such that one of said second windings aids an corresponding first winding when another second winding opposes the corresponding first winding thereby to oscillate said armature structure.

5. An electromagnetic transducer according to claim 4 wherein said open magnetic core structures comprise stacks of E-shaped laminations.

6. An electromagnetic transducer according to claim 5 wherein said armature structure comprises respective stacks of I-shaped laminations for completing the magnetic circuits of said stacks of E-shaped laminations.

* * * * *